United States Patent Office 3,304,872
Patented Feb. 21, 1967

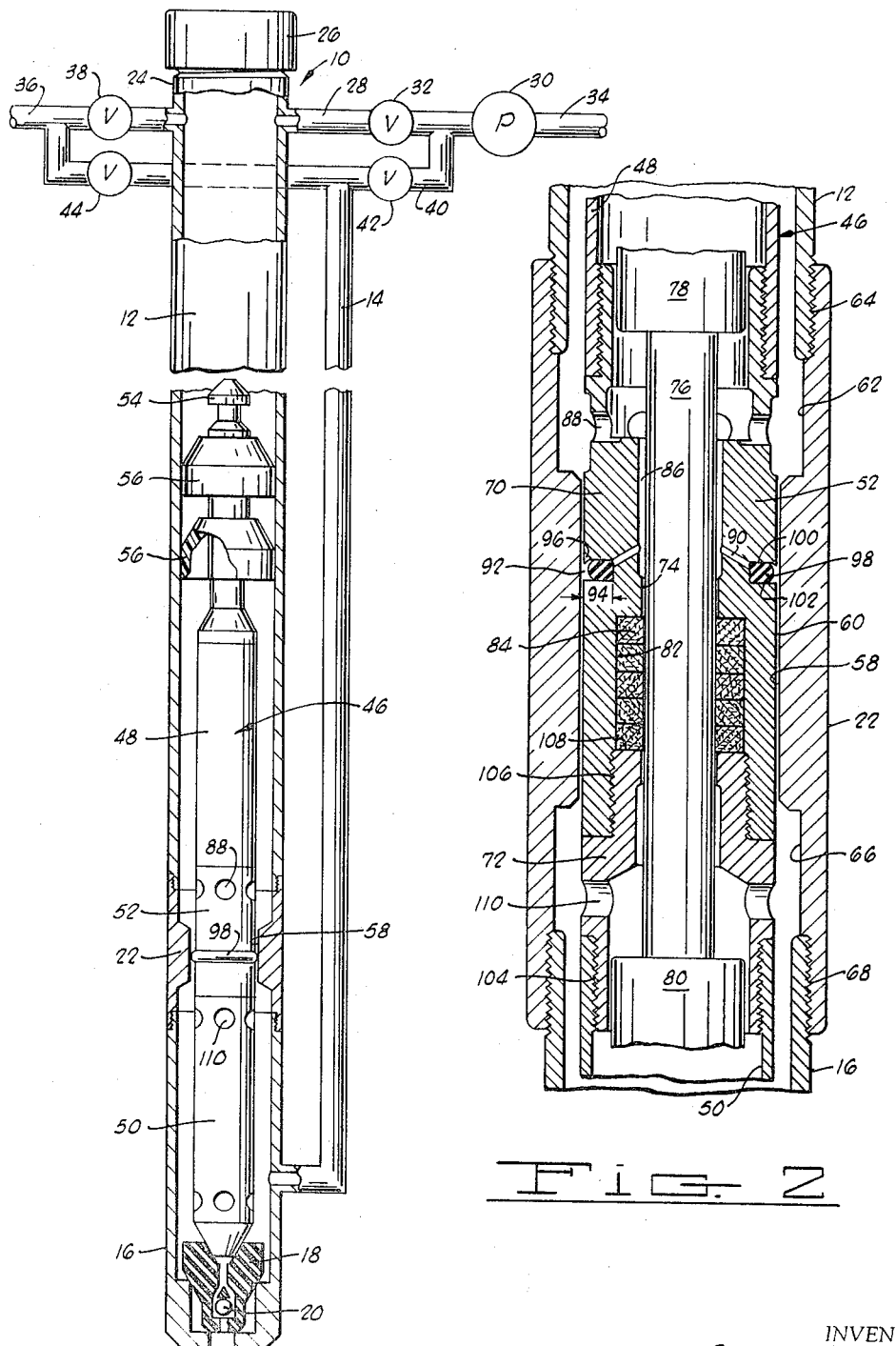

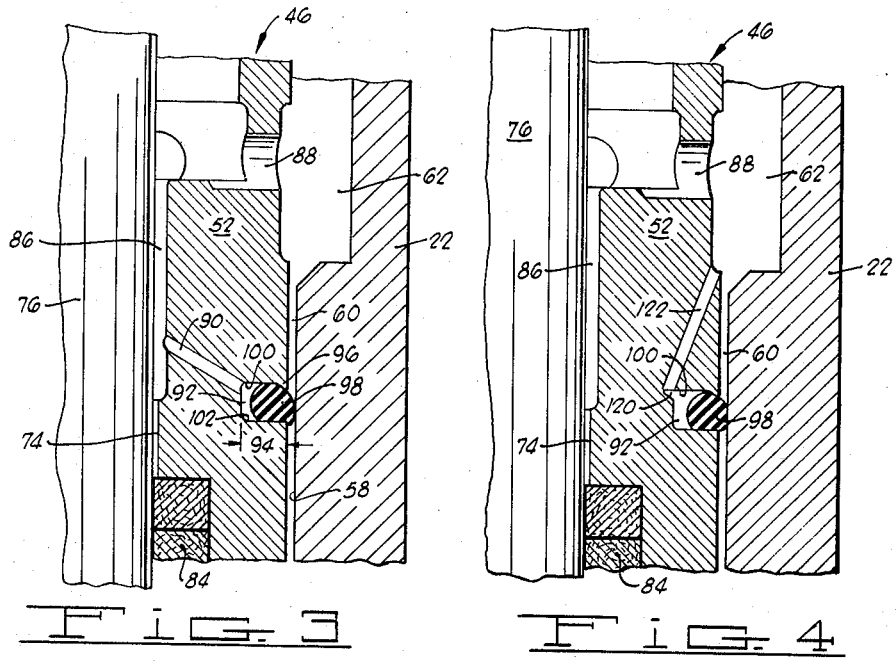
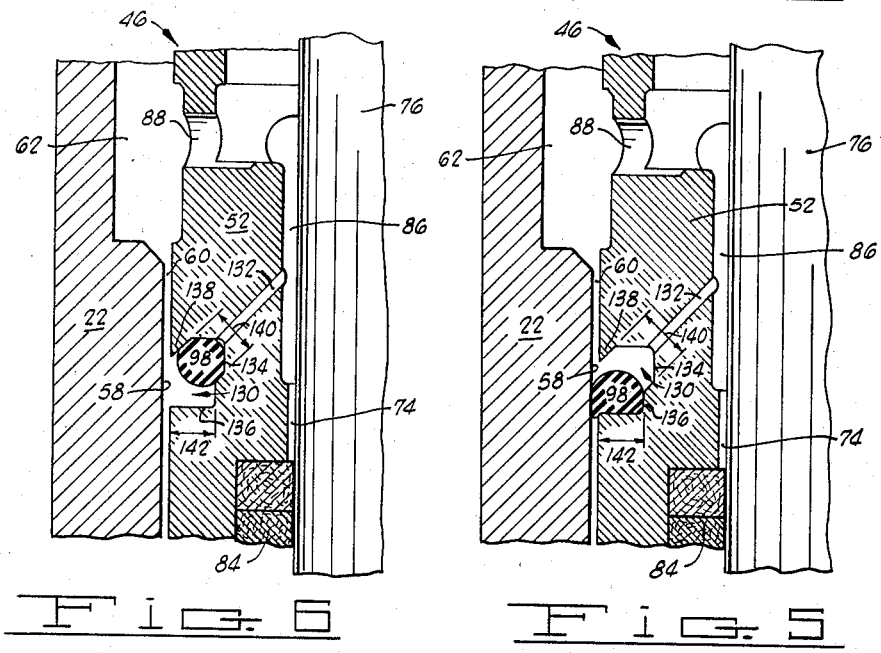

3,304,872
SEALING MEANS
Charles L. English, 2204 E. 25th Place,
Tulsa, Okla. 74114
Filed May 3, 1965, Ser. No. 452,718
10 Claims. (Cl. 103—46)

This invention relates generally to improved means for sealing between two relatively moving members. More particularly, but not by way of limitation, this invention relates to an improved means for forming a fluid-tight seal between a well pump assembly and a well tubing in which the pump assembly is disposed.

The present invention comprises certain improvements over the high pressure seal disclosed in United States Patent No. 2,568,320, issued September 18, 1951, to Clarence J. Coberly. In the Coberly patent, an O-ring is located in an annular groove formed in a pump that is disposed in a pump tubing. Due to the depth of the annular groove, the O-ring is held in engagement with a sealing collar connected in the pump tubing when the pump is disposed in the pump tubing to isolate the interior of the pump tubing above from the interior thereof below the collar.

A plurality of passageways extend upwardly from the groove in which the O-ring is positioned into communication with the interior of the pump tubing above the O-ring. The O-ring, which is held in sealing engagement with the interior of the sealing collar, prevents the flow of fluid through the pump tubing between the pump and sealing collar.

The type of pump disclosed in the Coberly patent is known as a "free" pump. Generally, a "free" pump is moved by fluid and gravity into operating position in the lower end of the pump tubing and is removed therefrom by reversing the direction of fluid to move the pump upwardly in the pump tubing. The interior of the pump tubing above the sealing collar is larger than the interior of the collar so that as the pump is removed from the sealing collar the O-ring seal has a tendency to be blown off of the pump and damaged or destroyed upon movement out of the collar. The passageways provided in the Coberly patent are sized so that the pressure on either side of the O-ring seal is equalized almost instantaneously as the O-ring moves into the larger diameter to prevent a differential in pressure from occurring across the O-ring and blowing the O-ring off the pump as previously mentioned.

This invention provides an improved sealing device including a first member such as a sealing collar, having a bore extending therethrough and an enlarged counterbore formed in at least one end thereof and a cylindrical member such as a pump assembly, slidingly disposed in the bore and forming an annulus with the first member. The cylindrical member is provided with an annular groove arranged to be disposed adjacent the first member and having one or more passageways extending from the groove through the cylindrical member into communication with the counterbore. A resilient annular seal is disposed in the groove and is sized to be fully received therein so that the seal member will, in response to pressure in the passageways, move into sealing engagement with the first member to form a fluid-tight seal between the first member and cylindrical member and will, in response to a pressure in the annulus on the side of the seal member remote from the counterbore, move completely into the groove, thereby preventing the formation of a differential in pressure across the O-ring, and alleviating the possibility of blowing the seal member off the cylindrical member.

It is one object of the invention to provide an improved sealing device that alleviates the possibility of damage to an annular seal member incorporated therein.

Another object of the invention is to provide an improved sealing device that has an extended service life.

A further object of the invention is to provide an improved fluid-operated pumping device having a seal member thereon that will not be blown off the pump during movement of the pump in the pump tubing.

A still further object of the invention is to provide an improved fluid-operated pumping device that is arranged to avoid the formation of a pressure differential across the seal member thereby extending the service life of the pumping device.

Still another object of the invention is to provide an improved one-way seal for use with a pumping device that effectively prevents the flow of fluid thereby in one direction and permits the flow of fluid thereby in the opposite direction.

One other object of the invention is to provide an improved sealing device for use with relatively moving and telescoping members to prevent the flow of fluid between the members in one direction and to permit the flow of fluid between the members in the opposite direction.

The foregoing and additional objects and advantages of the invention will become more apparent when the following description is read in conjunction with the accompanying drawings wherein like reference characters denote like parts of all views and wherein:

FIG. 1 is a view, partly in elevation and partly in cross-section, illustrating apparatus incorporating an improved sealing device constructed in accordance with the invention;

FIG. 2 is an enlarged cross-sectional view of a portion of the apparatus illustrated in FIG. 1;

FIG. 3 is an enlarged cross-sectional view of a portion of FIG. 2 and illustrating another operating position of a seal member therein;

FIG. 4 is a cross-sectional view similar to FIG. 3, but illustrating a modified form of the apparatus shown therein;

FIG. 5 is a view similar to FIG. 3 but illustrating still another embodiment of sealing device also constructed in accordance with the invention; and, FIG. 6 is a view similar to FIG. 5, but illustrating the seal member in a different operating position.

EMBODIMENT OF FIG. 1

Referring to the drawing and to FIG. 1 in particular, shown therein, and generally designated by the reference character 10 is well-pumping apparatus constructed in accordance with the invention. As shown therein, the pumping apparatus 10 includes an elongated pump tubing 12 arranged to be inserted in a well bore or the like (not shown). It should be understood that the pump tubing 12 is generally constructed from a plurality of relatively short sections of tubing threadedly connected in end-to-end relationship. A tubing string 14 also extends into the well bore (not shown) in parallel relationship with the pump tubing 12 and is connected with the pump tubing 12 at its lower end 16 in any suitable manner to provide communication therebetween.

The lower end 16 of the pump tubing 12 is arranged to receive a pump seat 18 having a one-way valve 20 disposed in its interior that is arranged to permit fluid flow from the well bore (not shown) into the lower end 16 of the pump tubing 12 and to prevent flow therethrough in the opposite direction.

A sealing collar 22 is connected in the pump tubing 12 above the pump seat 18 as will be described more fully hereinafter. An upper end 24 of the pump tubing 12 is closed by a cap 26 that is threadedly attached thereto. An inlet conduit 28 extends from a surface mounted pump 30 into communication with the upper end 24 of the pump tubing 12 so that fluid can be delivered from the pump 30 into the interior of the pump tubing 12. A valve 32 is connected in the conduit 28 to provide means for controlling the flow of fluid through the inlet conduit 28. A suction conduit 34 has one end connected with the pump 30 and the other end connected with a source of fluid (not shown). A discharge conduit 36 extends from the upper end 24 of the pump tubing 12 and has a valve 38 located therein for controlling the flow of fluid therethrough.

A conduit 40 has one end connected with the inlet conduit 28 between the pump 30 and the valve 32 and extends therefrom into connection with the outlet conduit 36 on the downstream side of the valve 38. Stated in another way, the connection is located so that the valve 38 is disposed between the connection between the conduit 40 and conduit 36 and the pump tubing 12. The upper end of the tubing string 14 is connected with the conduit 40 whereby fluid can be delivered from the pump 30 through the conduits 28 and 40 into the tubing string 14 for purposes which will become more apparent hereinafter.

A valve 42 is located in the conduit 40 between the connection of the conduit 40 with the inlet conduit 28 and the connection of the tubing string 14 with the conduit 40. A valve 44 is also located in the conduit 40 between the connection of the conduit 40 with the tubing string 14 and the connection of the conduit 40 with the outlet conduit 36. In the usual installation of the pump tubing 12 and tubing string 14 in a well bore (not shown), they are connected near their upper ends with a unitary valve mechanism (not shown) that includes internal passageways and valve mechanisms arranged to provide similar flow passageways and to perform the same functions as the separate valves and conduits described in FIG. 1.

A pump assembly, generally designated by the reference character 46, is disposed in the pump tubing 12. The pump assembly 46 is sized to be moved through the pump tubing 12 for insertion therein and removal therefrom. The pump assembly 46 is of the type generally referred to as a "free" or "free piston" pump. A suitable "free piston" pump assembly is shown and described in my U.S. Patent No. 3,109,379, issued Nov. 5, 1963.

As illustrated in FIG. 1, the pump assembly 46 includes an upper portion or motor 48, a lower portion or pump 50, and a middle plug 52 connecting the motor 48 and the pump 50 as will be described. The pump assembly 46 is illustrated as being disposed in the pump tubing 12 with the lower end of the pump 50 in engagement with the pump seat 18. When located in this position in the pump tubing 12, the middle plug 52 of the pump assembly 46 is disposed, at least partially, in the sealing collar 22.

The extreme upper end of the pump assembly 46 is configured to provide a conventional fishing neck 54. A pair of spaced resilient sealing cups 56 encircle the upper end of the pump assembly 46 between the fishing neck and the motor 48. The seal cups 56 are constructed from a resilient material such as a natural or synthetic rubber, sized to sealingly engage the interior of the pump tubing 12, and arranged to prevent fluid flow upwardly thereby and to permit flow downwardly thereby.

FIG. 2 illustrates in more detail the structure of the sealing collar 22 and the adjacent portions of the pump assembly 46. As shown therein, the sealing collar 22 has a bore 58 extending axially therethrough forming an annulus 60 with the exterior of the middle plug 52 of pump assembly 46. An enlarged counterbore 62 is formed in the upper end of the sealing collar 22 coaxially with the bore 58. The counter-bore 62 is threaded at 64 for connecting the collar 22 with the pump tubing 12. An enlarged counterbore 66 is provided in the lower end of the collar 22 and is threaded at 68 for connecting the collar 22 with the lower end 16 of the pump tubing 12.

The middle plug 52 of the pump assembly 46 includes an upper member 70 and a lower member 72. The upper member 70 includes a bore 74 that is sized to loosely receive a connecting rod 76 extending between the lower end of a motor piston 78 and the upper end of a pump piston 80. A partially threaded counterbore 82 in the upper portion 70 is provided to accommodate a packing or stuffing 84 that sealingly engages the connecting rod 76.

The bore 74 is enlarged at 86 so that the annular space formed between the bore 86 and the connecting rod 76 has a cross-sectional area larger than the annulus 60. The upper end of the enlarged bore 86 is in fluid communication with the interior of the counterbore 62 through a plurality of apertures 88 formed in the middle plug 52.

A plurality of passageways 90 extend from the enlarged bore 86 into an annular groove 92 that extends around the exterior of the middle plug 52. The total cross-sectional area of the passageways 90 is also greater than the cross-sectional area of the annulus 60.

As may be seen in FIG. 2 and more clearly in FIG. 3, the annular groove 92 is generally rectangular in configuration, having its largest dimension 94 disposed normal to the elongation of the collar 22. A depending lip portion 96 extends around the periphery of the middle plug 52 projecting downwardly into the annular groove 92.

An annular resilient seal 98, such as an O-ring, is disposed in the annular groove 92 and is adapted to sealingly engage the interior bore 58 of the sealing collar 22 as illustrated in FIGS. 1 and 3. As can be perceived from viewing FIG. 2, the relative sizes of the annular groove 92 and the seal member 98 are such that the seal member 98 can be fully received in the annular groove 92. It should also be pointed out that the seal 98 is sufficiently thick to sealingly engage the opposed surfaces 100 and 102 of the annular groove 92 to prevent fluid flow therethrough from the annulus 60 into the passageways 90 or vice versa.

The lower member 72 of the middle plug 52 is threadedly connected to the pump 50 by threads 104 and threadedly connected to the upper member 70 by threads 106. An upper surface 108 of the lower member 72 engages the stuffing 84 to deform it into sealing engagement with the connecting rod 76. A plurality of apertures 110 extend through the lower member 72 to provide communication from the pump 50 into the interior of the lower end 16 of the pump tubing 12.

*Operation of the embodiment of FIG. 1*

The pump assembly 46 is positioned in the pump tubing 12 by removing the cap 26 and then placing the pump assembly 46 in the upper end 24 of the pump tubing 12. The valves 32 and 44 are placed in the open position and the valves 42 and 38 are placed in the closed position. The pump 30 is actuated to deliver fluid through the inlet conduit 28 into the interior of the pump tubing 12 above the pump assembly 46 to force the pump assembly 46 downwardly through the pump tubing 12. Fluid in the pump tubing 12 below the pump assembly 46 is displaced upwardly through the tubing string 14 into the conduit 40, through valve 44, and outwardly through the discharge conduit 36. The downward movement of the pump assembly 46 in the pump tubing 12 is arrested upon engagement of the pump 50 with the pump seat 18.

Continued operation of the pump 30 causes a pressure increase in the pump tubing 12, in the enlarged bore 60 of the sealing collar 22, and in the passageways 90. Since the passageways 90 have a combined cross-sectional area greater than the area of the annulus 60, a differential in pressure exists therebetween, displacing the seal member 98 relatively outwardly in the annular groove 92 and into sealing engagement with the bore 58 in the sealing collar 22 as illustrated clearly in FIG. 3. When the seal member 98 has closed the annulus 60, the interior of the pump tubing 12 above the sealing collar 22 is isolated from the interior of the lower end 16 of the pump tubing 12 below the sealing collar 22.

Continued operation of the pump 30 results in a build up in pressure in the fluid or power oil in the interior of the tubing 12 above the sealing collar 22, causing the motor 48 to reciprocate also reciprocating the connecting rod 76. Reciprocation of the rod 76 reciprocates the pump 80 to deliver fluids from the well bore (not shown) that have entered the pump 50 through the pump seat 18 and the one-way valve 20 located therein.

When it is desired to remove the pump assembly 46 from the pump tubing 12, the valves 32 and 44 are closed and the valves 42 and 38 are opened. With the valves in the positions described, fluid is directed from the pump 30 through the conduit 40 and through the tubing string 14 into the interior of the lower end 16 of the pump tubing 12. Simultaneously, the opening of the valve 38 has released the pressure in the pump tubing 12 above the sealing collar 22 so that a differential in pressure now exists across the sealing collar 22 in an upwardly direction.

When the differential in pressure occurs, the seal member 98 is subjected to a relatively high pressure in the annulus 60 that drives the seal member 98 relatively toward the passageway 90 and out of engagement with the sealing collar 22 as illustrated clearly in FIG. 2. With the valve member 98 moved fully into the annular groove 92, fluid flows upwardly through the annulus 60 into the counterbore 62 in the sealing collar 22 and into the interior of the pump tubing 12 where it engages the sealing cups 56 forcing them outwardly into tight sealing engagement with the interior of the pump tubing 12. The fluid pressure thereby exerts an upward force on the pump assembly 46.

Continued operation of the pump 30 drives the pump assembly 46 upwardly through the pump tubing 12 until it reaches the upper end 24 thereof from which it may be removed after removal of the cap 26. Power oil or fluid located in the pump tubing 12 above the pump assembly 46 is displaced into the discharge conduit 36 through the open valve 38 as the pump assembly 46 travels upwardly in the pump tubing 12.

FIG. 4 is a cross-sectional view similar to FIG. 3 but showing a slightly modified structure of the middle plug 52. The modification made to the structure illustrated in FIG. 3 comprises the provision of annular notch 120 formed in the inner most surface of the annular groove 92 and adjacent the upper surface 100 defined thereby. A plurality of passageways 122 extend from the annular notch 120 into communication with the interior of the counterbore 62 in the sealing collar 22. The passageways 122 are sized so that the total cross-section area of the passageways 122 will be greater than the cross-sectional area of the annulus 60.

As may be perceived by comparing FIGS. 3 and 4, the modifications made do not affect the function or operation of the seal member 98 in relation to the sealing collar 22. Fluid pressure in the counterbore 60 forces fluid through the passageway 122, the annular notch 120 and into the annular groove 92. Pressure exerted in the annular groove 92 forces the seal member 98 relatively outwardly in the annular groove 92 and into engagement with the sealing collar 22 as illustrated in FIG. 4. The seal member 98 remains in sealing engagement with the sealing collar 22 so long as a pressure differential exists from the interior of the pump tubing 12 above the sealing collar 22 to the interior of the lower end 16 of the pump tubing 12 below the sealing collar 22.

If a higher pressure should exist in the interior of the lower end 16, fluid pressure in the annulus 60 exerts a force on the seal member 98 moving it into the annular groove 92 relatively toward the annular notch 120, forcing the seal member 98 out of engagement with the sealing collar 22 and permitting the flow of fluid from the interior of the lower end 16 through the annulus 60 into the counterbore 62 and interior of the pump tubing 12 above the sealing collar 22.

EMBODIMENT OF FIG. 5

FIGS. 5 and 6 illustrate a modified configuration of an annular groove designated generally by the reference character 130. As can be perceived, the annular groove 130 is located in the middle plug 52 of the pump assembly 46. In view of the identity of the various parts thereof, the same reference characters will be used in the description of FIGS. 5 and 6 as were used in the description of the previous figures.

The annular groove 130 is connected with the enlarged bore 86 in the middle plug 52 by a plurality of passageways 132. The passageways 132 have a total cross-sectional area that is greater than the cross-sectional area of the annulus 60.

The annular groove 130 may be described as being elongated in a direction parallel to the pump tubing 12 and as having a relatively deep upper portion 134 that is disposed relatively near the enlarged bore 62 of the collar 22 when the pump assembly 46 is positioned therein. The groove 130 also has a lower portion 136 that does not extend as deeply into the middle plug 52 as does the upper portion 134 of the annular groove 130.

A depending annular lip 138 extends downwardly from the middle plug 52 into the annular groove 130 defining a width 140 (see FIG. 5) of the upper portion 134 that is slightly less than the thickness of the seal member 98 for purposes that will be explained more fully hereinafter. Also, it should be pointed out that the lower portion 136 has a depth 142 that is less than the thickness of seal member 98 for purposes that will be described hereinafter.

*Operation of the embodiment of FIG. 5*

As illustrated in FIG. 5, the seal member 98 is positioned in the annular groove 130 in the position that it occupies as a result of a pressure differential wherein the high pressure is in the pump tubing 12 above the collar 22. As shown therein, the seal member 98 is disposed in the lower portion 136 of the annular groove 130 in sealing engagement with the bore 58 of the sealing collar 22 to permit the flow of fluid downwardly through the annulus 60. The seal member 98 is moved into sealing engagement with the bore 58 since the depth 142 of the lower portion 136 of the groove 130 is less than the thickness of the seal member 98. With the seal member 98 in this position, it can be seen that fluid in the pump tubing 12 above the sealing collar 22 will be isolated from fluid in the lower end 16 of the pump tubing 12 below the sealing collar 22.

When it is desired to remove the pump assembly 46 from the pump tubing 12, the flow from the pump 30 is diverted into the tubing string 14 as previously described so that pressure will be applied in the lower end 16 of the pump tubing 12 below the sealing collar 22. When this occurs, fluid pressure in the annulus 60 below seal member 98 exerts an upward force thereon moving the seal member 98 upwardly in the annular groove 130 until the seal member 98 engages the lip 138. Engagement of the seal member 98 with the lip 138 prevents communication between the annulus 60 and the passageways 132 so that the pressure differential between the annulus 60 and the passageways 132 moves the seal member 98 into the upper portion 134 of the annular groove 130 out of engagement with the sealing collar 22 as illustrated in FIG. 6. Fluid in the annulus 60 below the seal member 98 flows upwardly therethrough until it engages the sealing cups 56 driving the pump assembly 46 upwardly through the pump tubing 12 as described in connection with the operation of the embodiment of FIG. 1.

Due to the movement of the seal member 98 into the upper portion 134 of the annular groove 130, it can be seen that the seal member 98 is firmly retained therein until the annular groove 130 moves into the enlarged bore 62 and into the pump tubing 12. It can be appreciated that upon movement of the seal member 98 into the enlarged bore 62 the pressures on either side of the seal member 98 are equalized, but that the seal member 98 is securely retained in the annular groove 130 preventing damage to the seal member 98 as the pump assembly 46 is removed from the well.

It is believed apparent from the foregoing detailed description of the various embodiments of sealing devices that each of the embodiments will form an effective fluid-tight seal between the middle plug 52 and the sealing collar 22 to successfully isolate fluids in the pump tubing 12 above the sealing collar 22 from fluids therein below the sealing collar 22 thereby permitting the efficient operation of the pump assembly 46. Also, it is believed apparent from the foregoing that each of the embodiments of sealing device described will be effective to prevent the damage or destruction of the seal member 98 during the removal of the pump assembly 46 from the pump tubing 12.

As previously mentioned, the critical period, insofar as the seal member 98 is concerned, occurs when the seal member 98 is moved adjacent the enlarged counterbore 62 in the sealing collar 22. This invention provides means for creating a pressure differential to move the seal member 98 positively into its associated annular groove to prevent damage during movement of the pump assembly 46 in the sealing collar 22 and to effectively equalize the pressure on both sides of the seal member 98 as the seal member 98 moves into the enlarged counterbore 62 to avoid blowing the seal member 98 off the middle plug 52 of the pump assembly 46.

It should also be understood that the embodiments described in detail herein are presented by way of example only and many modifications and changes thereto can be made without departing from the spirit of the invention or from the scope of the annexed claims.

What I claim is:

1. In an improved sealing device, the combination of:
   a first member having a bore extending there-through and a counterbore formed in one end thereof with the counterbore being of larger diameter than said bore;
   a cylindrical member slidingly disposed in said bore forming an annulus with said first member and having
      an annular groove encircling said cylindrical member adjacent said first member, and
      a passageway extending from said groove through a portion of said cylindrical member into communication with said counterbore, said passageway having a cross-sectional area greater than the cross-sectional area of said annulus; and,
   a resilient annular seal member disposed in said groove and sized to be fully received therein, said seal member being moved in said grove in response to pressure in said passageway into sealing engagement with said first member to form a fluid-tight seal between said cylindrical member and first member and being moved into said groove out of engagement with said first member in response to pressure in said annulus on the side of said seal member remote from said counterbore, said cylindrical member being reciprocably disposed in said first member and movable to a position in which said groove and seal are positioned in said counterbore.

2. In the improved sealing device of claim 1 wherein said passageway is connected with a portion of said annular groove most remote from said annulus.

3. In the improved sealing device of claim 1 wherein said annular groove is of generally rectangular cross-section having the largest dimension thereof disposed relatively perpendicularly to said bore; and wherein said passageway is connected with a portion of said annular groove most remote from said annulus.

4. In the improved sealing device of claim 3 wherein said annular seal member is sized to extend across the lesser dimension of said annular groove into sealing engagement with said cylindrical member, thereby preventing flow from said passageway into said annulus.

5. In the improved sealing device of claim 1 wherein said annular groove is elongated in a direction parallel to said bore and has
   a first portion sized to receive said seal member and connected with said passageway, whereby said seal member is out of engagement with said first member; and,
   a second portion disposed further from said counterbore than said first portion when said groove is disposed in said bore, sized to position said seal member in engagement with said first member to form a fluid-tight seal between said first member and cylindrical member when said seal member is moved into said second portion in response to pressure in said passageway.

6. In an improved fluid-operated pumping device, the combination of:
   a pump tubing having a pump seat adjacent its lower end;
   a sealing collar connected in said tubing and spaced from said seat;
   a fluid-operated pump assembly disposed in said pump tubing and adapted to be passed through said tubing into engagement with said seat, said pump assembly having a middle plug disposed in said collar and forming an annulus therewith when said pump is in engagement with said seat; said middle plug having
      an annular groove encircling the exterior thereof, and
      a passageway extending therethrough from said groove into communication with the interior of said tubing relatively above said sealing collar; and,
   a resilient annular seal member disposed in said groove and sized to be fully received therein, said seal member being moved in said groove in response to pressure in said passageway into engagement with said collar to form a fluid-tight seal between said middle plug and collar and being moved into said groove out of engagement with said collar in response to pressure in said tubing below said collar whereby the fluid pressure above and below said seal member is equalized.

7. In the improved pumping device of claim 6 wherein said passageway is connected with a portion of said annular groove most remote from said collar and having a cross-sectional area greater than the cross-sectional area of said annulus.

8. In the improved pumping device of claim 7 wherein said annular groove is of generally rectangular cross-section having the largest dimension thereof disposed normal to said tubing; and wherein the smallest dimension thereof is less than the thickness of said annular seal member, whereby said seal member is in sealing engagement with said middle plug preventing flow from said passageway into said annulus through said groove.

9. In the improved pumping device of claim 7 wherein said annular groove is elongated in a direction parallel to said tubing and has
   a first portion, relatively remote from said seat, sized to receive said seal member and connected with said passageway, whereby said seal member is out of engagement with said sealing collar; and,
   a second portion, relatively near said seat, sized to position said seal member in engagement with said collar to form a fluid-tight seal between said middle plug and collar when said seal member is moved into said second portion in response to pressure in said passageway.

10. In an improved fluid-operated pumping device, the combination of:

a pump tubing adapted to be disposed in a well bore and having a pump seat adjacent its lower end;

a second tubing adapted to be disposed in the well bore and connected at the lower end with said pump tubing above said seat;

valve means connected with the upper end of said pump tubing and second tubing whereby fluid can be directed into either tubing selectively;

a sealing collar connected in said pump tubing relatively above the connection between said pump tubing and second tubing;

a fluid-operated pump assembly adapted to be passed through said pump tubing into engagement with said seat, said pump including a motor portion including a fluid-operated motor, at least one seal cup mounted on the upper end of said motor portion in engagement with the interior of said pump tubing, a pump portion including a fluid pump drivingly connected with said motor, a middle plug connecting said motor and pump portions, said middle plug being at least partially disposed within said sealing collar and forming an annulus therewith when said pump assembly is in engagement with said seat, said middle plug having an annular groove encircling the exterior thereof adjacent said collar and having a passageway of larger cross-sectional area than the cross-sectional area of said annulus extending from said annular groove into communication with the interior of said pump tubing above said collar; and, a resilient annular seal member disposed in said groove and sized to be fully received therein, said seal member being moved in said groove in response to pressure in said passageway and tubing above said collar into sealing engagement with said collar to form a fluid-tight seal between said middle plug and collar thereby isolating fluid in said tubing above and below said collar whereby the fluid in said tubing above said collar drives said motor to actuate said pump and being moved into said groove out of engagement with said collar in response to pressure in said second tubing and pump tubing below said collar whereby the pressure above and below said seal member is equalized and fluid can pass through said annulus from said second tubing to exert a force on said seal cup to drive said pump assembly upwardly through said pump tubing.

References Cited by the Examiner
UNITED STATES PATENTS

| | | | |
|---|---|---|---|
| 2,614,793 | 10/1952 | Storm | 137—525 |
| 3,085,515 | 4/1963 | Workman | 103—178 |
| 3,224,378 | 12/1965 | Graham | 103—178 |

ROBERT M. WALKER, *Primary Examiner.*